Patented Aug. 23, 1949

UNITED STATES PATENT OFFICE 2,479,990

PREPARATION OF 1-NAPHTHYLAMINE-2-SULFONIC ACID

Andrews C. Wintringham, Glen Ridge, Lawrence Richardson Moffatt, Upper Montclair, and Robert Carland Conn, Bound Brook, N. J., assignors to American Cyanamid Company, New York, N. Y., a corporation of Maine No Drawing. Application June 21, 1947, Serial No. 756,338

9 Claims. (Cl. 260—508)

The present invention relates to an improved method for the preparation of 1-naphthylamine-2-sulfonic acid and its salts from salts of naphthionic acid.

In the past, 1-naphthylamine-2-sulfonic acid has been prepared by heating sodium naphthionate at 200° C. which results in a re-arrangement of the 1-naphthylamine-4-sulfonic acid salt to the 1-2 isomer. The processing gives considerable difficulty because of decomposition and bad yields. Some of the disadvantages are probably due to the difficulty of heating a solid uniformly. Much higher yields have been obtained in the past by using a high boiling diluent such as naphthalene. This improves the heat transfer and renders the reaction smoother, but in turn involves the serious practical disadvantage resulting from the removal of the diluent and isolation of the product.

The present invention produces improved yields of 1-naphthylamine-2-sulfonic acid and its salts without the difficulties of recovery inherent in the methods using diluents. According to the invention, the naphthionic acid salt, customarily the sodium salt, is thermally re-arranged in the presence of an anhydrous salt of a strong base and an acid weaker than sulfurous acid.

The mechanism of the reaction of the present invention has not been fully determined and therefore it is not desired to limit the invention to a particular theory. We believe, however, that one factor is the production of sulfur dioxide and bisulfate by some side reactions in the re-arrangement. That sulfur dioxide is produced is definitely known and can be readily determined by the odor. It seems quite possible that these acidic decomposition products exert an auto-catalytic effect and accelerate the decomposition reactions which produce the lowered yields. We believe that one factor operating in the present invention is the neutralization of these acidic products by the added salts. This seems probable because the results are not good unless the anion of the salt is that of an acid weaker than sulfurous acid. Also, if insufficient salt is incorporated in the reaction mixture, an odor of sulfur dioxide is almost always noted when a batch gives poor results. We believe, therefore, that the above explanation of the operation of the salts is probably close to the truth and is a material factor even though it may not be the only one.

It is an advantage of the present invention that the added salts may include a wide range of material. Apart from the requisite strength of the acidic anion of the salt, it is also necessary that the salt should not decompose at reaction temperature in a way to interfere with the operation of the salt. Thus, for example, sodium carbonate is an excellent material, but sodium bicarbonate can also be used. It is true that the latter decomposes partially to give off carbon dioxide at the reaction temperature, but carbon dioxide is harmless and therefore compounds such as the bicarbonates may be used. Salts of organic acids are also useful where they are sufficiently weak, provided there is no extensive decomposition of the organic anion under the reaction conditions. Typical weak acids which may form the anionic constituent of the salt are valeric, succinic, boric, silicic, carbonic, benzoic, furoic, adipic, propionic, aluminic, lactic, and acetic.

The cationic constituents of the salt may be any of the alkali or alkaline earth metals such as sodium, potassium, calcium, lithium and the like. Because of its cheapness, compounds of sodium are ordinarily preferable for economic reasons. The reaction, however, is in no sense limited to these products as the salts of other alkaline metals or alkaline earth metals give results which are technically just as satisfactory. The sodium salts are preferred merely because of cost.

The amount of salt to be used is not at all critical. It is, of course, necessary to use sufficient to neutralize acid products formed in the reaction. This will vary somewhat with the particular salt and can be readily determined by noting whether a strong odor of sulfur dioxide is produced. Such an odor shows that the amount of salt used is insufficient. In general, the amount of salt for optimum results will be approximately 10% of the naphthionate. This amount will vary somewhat with the molecular weight of the salt. Larger amounts may be used, but as they do not add anything to the yield, their additional cost is not justified.

The method by which the dry materials are reacted is also not critical. Care is, however, necessary in order to assure good contact. This may be effected readily by grinding the naphthionate with the salt to be used. The reaction may well be effected in the same equipment. Thus, for example, a ball mill, heated in an oil or air bath to 200° C. or higher forms a very effective apparatus for carrying out the reaction.

The reaction time may be varied widely. As it is quite rapid, good yields may often be obtained with vigorous agitation in as short a time as fifteen minutes. On the other hand, it is an advantage of the present invention that the protective effect of the added salts permits the reaction to run for a longer time and there is no necessity for a critical control of the time cycle.

When the reaction is over, the effect of the added salt is quite apparent. A clean and powdery product is obtained which often smells of ammonia. If, however, the salt is not present, the mixture is tarry and usually smells of sulfur dioxide. The cleanliness of the product greatly facilitates isolation and purification. While it is relatively clean, there is still present small amounts of decomposition products, but they are easily removed by slurrying in a hydrocarbon solvent such as toluene and filtration. The product may then be dissolved in water, filtered off from insoluble solids, and if necessary decolorized with charcoal or sodium hydrosulfite. A substantially pure salt of 1-naphthylamine-2-sulfonic acid is then precipitated by salting out. It may be transformed into the free acid if desired. Any of the naphthionate which is not reacted is left in solution as it is much more soluble and can be recovered by acidification.

In practice, the naphthionic acid salt which is used is sodium naphthionate. This does not mean that that particular cation is essential in the reaction, similar results being obtained if potassium naphthionate is used. In the following more specific description, including specific examples, the common sodium naphthionate is described as the raw material. Parts are by weight.

*Example 1*

A mixture of 125 parts anhydrous sodium naphthionate and 15 parts anhydrous sodium carbonate is agitated in a ball mill heated in an oil bath at 235° C. for five hours. When the mill is opened the contents are soft and powdery and smell of ammonia. The charge is washed with 870 parts toluene, dried, heated at 80° in 4000 parts water, and filtered. The sodium 1-naphthylamine-2-sulfonate is salted out of the filtrate by the addition of 1000 parts salt.

The omission of sodium carbonate in this experiment, or substituting for it dry sodium chloride or sodium sulfate, results in a tarry reaction product smelling of sulfur dioxide, from which the product is isolable, if at all, in much lower yields.

Substantially the same results are obtained if the reaction temperature is maintained at 200° C.

*Example 2*

The procedure of Example 1 is followed exactly, except that the time of heating is reduced to twenty minutes. The product is isolated by the same procedure.

*Example 3*

In the procedure of Example 1, the sodium carbonate is replaced by an equal weight of sodium bicarbonate. Substantially the same result is obtained.

*Example 4*

A mixture of 131 parts anhydrous sodium naphthionate and 15 parts anhydrous sodium aluminate is agitated in a ball mill for 5 hours at 235° C. The contents, which are loosely caked and smell of ammonia, are extracted with 700 parts refluxing toluene and dissolved in 3680 parts water at 80° C. The solution is filtered, filtered again with charcoal, bleached with a small quantity of sodium hydrosulfite, and treated with 855 parts sodium chloride to salt out the sodium 1-naphthylamine-2-sulfonate.

*Example 5*

A mixture of 125 parts anhydrous sodium naphthionate and 12.3 parts anhydrous calcium carbonate is heated in a ball mill for 4.7 hours at 235° C. The reaction mixture is worked up as described, the purified product finally being obtained in good yield by salting out.

*Example 6*

A mixture of 125 parts anhydrous sodium naphthionate and 15 parts anhydrous sodium acetate is ground and heated at 235° C. in a ball mill for fifteen minutes. The loosely powdered contents of the mill are worked up as described in Example 1, giving a good yield of sodium 1-naphthylamine-2-sulfonate.

Similar results are obtained if the sodium acetate is replaced by an equal weight of sodium succinate, the procedure being otherwise the same.

*Example 7*

A mixture of 125 parts anhydrous sodium naphthionate and 15 parts finely ground anhydrous sodium metasilicate is heated in a ball mill at 235° for one hour. The reaction product is washed with toluene and purified as described in Example 1, giving an excellent yield of sodium 1-naphthylamine-2-sulfonate.

If the sodium metasilicate is less finely ground, inferior results are obtained.

*Example 8*

A mixture of 120 parts anhydrous sodium naphthionate and 11 parts anhydrous lithium carbonate is agitated in a ball mill for four hours at 220°. The reaction product is washed with toluene, dried, and dissolved in 3700 parts water. After filtration with charcoal, salting out with 900 parts sodium chloride precipitates an excellent yield of sodium 1-naphthylamine-2-sulfonate.

It will be noted that the temperature may vary considerably. However, best results are obtained between about 190 and 290° C., yields or purities falling off considerably beyond this range. Since the present process constitutes a practical improvement and not a new type of reaction, the temperature should be kept within the optimum range in order to justify the process economically.

We claim:

1. A process of preparing 1-naphthylamine-2-sulfonic acid by heating a dry alkali metal naphthionate at a temperature between 190° C. and 290° C. in intimate contact with an amount of a dry neutralizing salt sufficient to neutralize acids set free in the reaction, the cation portion of said salt being selected from the group consisting of alkali metal and alkali earth metal cations, and said salt being a salt of an acid weaker than sulfurous acid.

2. A process of preparing 1-naphthylamine-2-sulfonic acid by heating a dry alkali metal naphthionate at a temperature between 190° C. and 290° C. in intimate contact with about 10% of a dry neutralizing salt, the cation portion of said salt being selected from the group consisting of alkali metal and alkali earth metal cations, and said salt being a salt of an acid weaker than sulfurous acid.

3. A process according to claim 1 in which the salt is a salt of carbonic acid.

4. A process according to claim 2 in which the salt is a salt of carbonic acid.

5. A process according to claim 1 in which the salt is sodium carbonate.

6. A process according to claim 2 in which the salt is sodium carbonate.

7. A process according to claim 1 in which the salt is sodium bicarbonate.

8. A process accordin gto claim 2 in which the salt is sodium bicarbonate.

9. A process according to claim 1 in which the salt is sodium aluminate.

ANDREWS C. WINTRINGHAM.
LAWRENCE RICHARDSON MOFFATT.
ROBERT CARLAND CONN.

REFERENCES CITED

The following references are of record in the file of this patent:

FOREIGN PATENTS

| Number | Country | Date |
|--------|---------|------|
| 56,563 | Germany | Jan. 21, 1890 |
| 72,833 | Germany | Nov. 26, 1892 |